United States Patent [19]

Shambaugh et al.

[11] 4,418,127
[45] Nov. 29, 1983

[54] BATTERY CELL MODULE

[75] Inventors: John S. Shambaugh, Holliston; Robert G. Yetman, Carlisle; Hyman Zeltzer, Needham, all of Mass.

[73] Assignee: The United States of America as represented by the Secretary of the Air Force, Washington, D.C.

[21] Appl. No.: 324,348

[22] Filed: Nov. 23, 1981

[51] Int. Cl.³ .......................................... H01M 14/00
[52] U.S. Cl. .......................................... 429/8; 429/53; 429/99; 429/149
[58] Field of Search ................. 429/53, 149, 163, 156, 429/121, 186, 122, 96-100, 8

[56] References Cited

U.S. PATENT DOCUMENTS

| 1,428,132 | 3/1922 | Wright. | |
| 3,784,411 | 1/1974 | Ciliberti, Jr. | 429/186 X |
| 3,822,150 | 7/1974 | Beardshear et al. | 429/156 X |
| 3,852,114 | 12/1974 | Dubin | 136/83 T |
| 4,053,691 | 10/1977 | Ciliberti, Jr. | 429/163 |
| 4,184,007 | 1/1980 | Urry | 429/149 X |
| 4,224,382 | 9/1980 | Taylor | 429/53 X |
| 4,276,361 | 6/1981 | Boudrot et al. | 424/186 |

Primary Examiner—Charles F. LeFevour
Attorney, Agent, or Firm—Donald J. Singer; Stanton E. Collier

[57] ABSTRACT

A modular lithium battery having a plurality of cells, having electrical connecting means connecting the cells to output terminals, and venting means for releasing discharge byproducts to a chemical scrubber. Stainless steel cell casings are potted in an aluminum modular case with syntactic foam and epoxy. The wall thickness resulting is about 0.5 inches.

5 Claims, 2 Drawing Figures

BATTERY CELL MODULE

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention.

This invention relates to battery cells, and more particularly, to a process of attaching said cells into a module structure.

2. Description of the Prior Art.

As the need arises to obtain higher voltages and/or current capacity, individual battery cells are electrically connected in a parallel or series manner. Depending upon the above requirements, individual battery cells can be structurally independent or grouped together to form a module of several cells which are further electrically connected to other modules to form a modular battery system.

In particular, the cells of the module can be structurally connected by a variety of techniques. For example, one method is to place the cells in a tray-like device with hold-down straps. This method fails to reduce the overall weight of the group of cells. The overall weight would be equal to the sum of the individual cell weights plus the weight of the tray and the hold-down straps. The module weight is of concern when its weight is close to a person's lifting ability or is used in a moving vehicle where extra weight equates into greater fuel consumption.

SUMMARY OF THE INVENTION

According to the present invention, significant weight reduction and structural strengthening are achieved by potting individual cells into a module structure. In a preferred embodiment, three cells are grouped together in the module. The number of cells is not critical. To obtain a battery system several modules are electrically connected together in a desired manner.

Basically, each cell case is positioned within a module case so that there is clearance between each case. Proper clearance is obtained by placing a plurality of spacers between the cases. A foam is then injected into the spaces between the cases. After hardening, a cover is bonded over the exposed foam. Electrical and venting connection are attached to the appropriate points.

One object of this invention is a modulor battery having individual battery cells epoxy foam potted into a module case so there is an electrical insulation between the cell cases and the module case which is an electrical ground.

Another object of the invention is a modular battery wherein the battery cells are secured within the module case independent of any cumulative tolerance buildup between the cases.

A further object is a modular battery having a more rigid structure by attaching the cases together by foaming.

A still further object is a modular battery having improved ability to withstand internal pressure compared to an unsupported cell case.

A last object is a modular battery having a reduced weight through the use of lightweight materials and a unique design.

Other objects, advantages, and novel features of the invention will become apparent from the following detailed description of the invention when considered in conjunction with the accompanying drawings and claims.

DESCRIPTION OF THE PREFERRED EMBODIMENT

Figure 1:
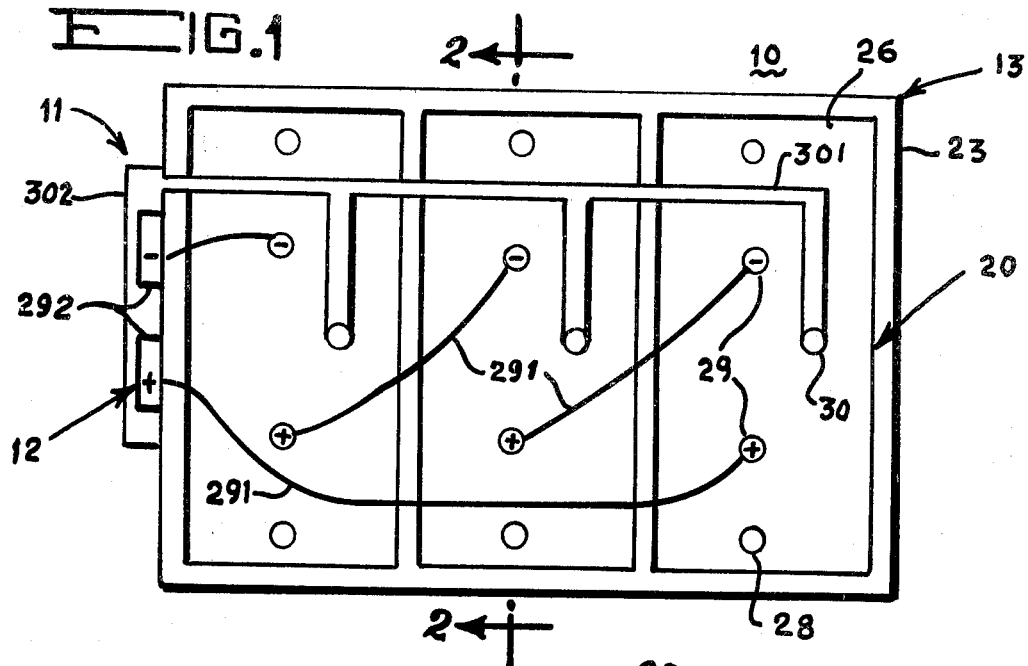
FIG. 1 is a top view of the modular battery.

Referring to FIG. 1, this illustrates a top view of a modular battery 10. Modular battery 10 is composed of means such as battery case 13 for containing battery cells 20, chemical scrubber means 11, and electrical connecting means 12.

Chemical scrubber means 11 being of conventional design is composed of venting means 301 and scrubber 302. Electrical connecting means 12 being of conventional design is composed of connecting leads 291 and case terminals 292.

Figure 2:
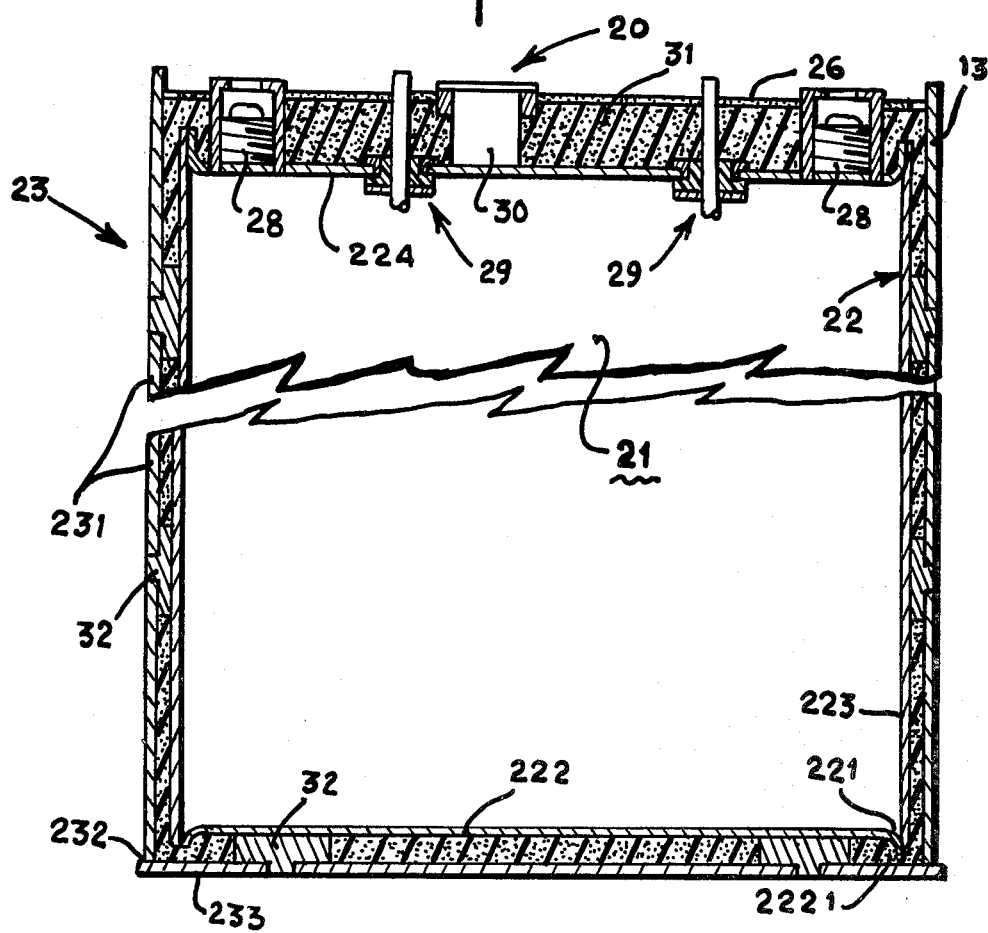
FIG. 2 is a cross section elevation view of a battery cell and module taken along the lines 2—2 of FIG. 1.

To further understand the construction of modular battery 10, FIG. 2 illustrates a cross-section through line 2—2 of FIG. 1. Battery case means 13 is composed of a modular casing 23 including a cover 26, spacers 32, and a foam 31.

Battery cell 20, shown in FIG. 2, is composed of a cell casing 22, fill ports 28, cell terminals 29, and a vent valve fitting 30. Cell compartment 21 contains cathode plates, anode plates, bus bars, connecting cables, and electrolyte, all not shown, being conventional in the art.

As seen in FIG. 1, cells 20 are connected in series by connecting leads 291 from cell terminals 29 to case terminals 292. In this embodiment modular battery 10 can be connected in parallel to other modular batteries (not shown) to achieve the proper voltage and current rating in a battery system.

While the battery is operating, discharge products are produced in cell compartments 21 as a normal byproduct of the electrical discharge of the battery cells. The gas pressure produced by the byproducts if not relieved could cause the cell case to rupture. This increased pressure is reduced by venting the gas through a pressure relief valve attached to fitting 30. The vented gas is piped by vent pipe 301 to chemical scrubber 302 which removes the corrosive discharge byproducts before venting to the atmosphere. Because of the possibility of greater pressures within compartment 21 than might occur in normal batteries, a stronger structure is needed.

Referring to FIG. 2, this shows the structural design of modular battery 10. Cell casing 22 forms a six sided rectangular compartment wherein the joining of the sides at edge 221, for example, is accomplished by forming a lip 2221 on a bottom 222. Lip 2221 is abutted against a flat side 223 after which the joint so formed is welded or closed by other techniques well known in the art. Cell casing in this embodiment is made of stainless steel with a nominal thickness of 0.078 inches.

Before a cell casing top 224 is attached, fill ports 28, terminals 29, and vent fittings 30 are attached to top 224. Ports 28, terminals 29 and fittings 30 are attached by means conventional in the art such as welding or pressure fittings. The internal components of cell compartment 21 are installed before top 224 is attached to the sides.

Modular casing 23 is formed in essentially the same manner as cell casing 22. Casing 23 has five metal sides preferably of 6061 T6 aluminum with a thickness of 0.187 inches and cover 26. A side 231 of battery casing 23 is abutted to bottom 233 at a joint 232. Joint 232 is sealed by welding or other techniques known in the art. In this particular embodiment, modular casing 23 is connected to ground so as to minimize weight.

Cell casings 22, three in this embodiment as shown in FIG. 1, are lowered into an interior void formed by modular casing 23. Spacers, such as a spacer 32, are used to insure proper spacing and for ease of production and conformity. Spacers 32 must be insulators also since there can be no electrical contact between modular casing 23 and cell casing 22. Spacers 32 are attached to the sides and bottom of casing 23 by conventional means such as plugs 321 inserted into holes in casing 23. Spacers are also placed between cell casings 22 to maintain proper separation therebetween.

Before the foam is applied all the surfaces must be "finished". The finishes involve using what are standard practices for achieving a good bond between the materials. This is achieved by roughing the surfaces of the parts to be bonded and insuring that they are thoroughly cleaned and free of any oil or other surface contaminents. This is accomplished by either chemically etching or sand blasting the parts and degreasing the parts in a vapor degreaser.

Additives can be incorporated in foam 31 or to the epoxies to reduce flammability. Particular additives to the epoxy resin are bromine and/or iron compounds.

After the foam has hardened, cover 26 preferably of 0.060 inches of plastic is bonded over the exposed foam to form the top side of casing 23.

By physically connecting stainless steel cell casing 22 through foam 31 to aluminum casing 23, a much more rigid composite modular structure is formed. The minimum thickness of the resulting composite wall is about 0.50 inches from the inside surface of cell casing 22 to the outside of modular battery casing 23. This greatly enhances the pressure capability of the modular battery by improvement in the wall stiffness with regard to withstanding internal pressure. This improved design increased the ability to withstand pressure by 5 to 1 compared to the unsupported cell casing. This is especially important in high energy lithium batteries used in missile systems.

It is to be noted that although there have been described the fundamental and unique features of my invention as applied to a preferred embodiment, various other embodiments, variations, adaptations, substitutions, additions, omissions, and the like may occur to, and can be made by, those of ordinary skill in the art, without departing from the spirit of the invention.

What is claimed is:

1. A battery cell module for use with high energy lithium sources comprising:

a plurality of battery cells, each of said battery cells having a cell casing made of metal and shaped as a rectangular compartment, a vent valve fitting attached to the top of said cell casing, a pair of cell electrical terminals attached to the top of said cell casing, and fill ports in the top of said cell casing;

means for containing said plurality of battery cells, said containing means including a metal modular casing shaped as a rectangular compartment having an open top, a plastic top cover for fixedly mounting in said open top of said modular casing, spacers for aligning and electrically insulating said battery cells mounted in said containing means, and foam for potting said plurality of battery cells in said modular casing, said foam filling voids between said modular casing and said cell casing and being bonded to said modular casing, said top cover, and each of said cell casing to form a composite wall being a unitized structure capable of withstanding high internal pressure from within said battery cells;

means for electrically connecting said plurality of battery cells, said electrically connecting means connected to said cell electrical terminals, said cell electrical terminals extending through said top cover of said modular casing whereon said electrically connecting means makes contact; and chemical scrubbing means attached to the external surface of said modular casing, said scrubbing means operably connected to said vent valve fitting of each of said battery cells extending through said top cover.

2. A battery cell module as defined in claim 1 wherein said cell casing is made of aluminum metal and said modular casing is made of stainless steel.

3. A battery cell module as defined in claim 1 wherein said cell casing and said modular casing form said composite wall of approximately 0.50 inches thickness.

4. A battery cell module as defined in claim 1 wherein said foam being bonded to said modular casing, to said plurality of cell casings, and to said top cover provides a substantially pressure resistance module, said foam being syntactic in nature to reduce weight and to strengthen the bond between said modular casing and said plurality of cell casings.

5. A battery cell module as defined in claim 4 wherein said syntactic foam has incorporated therein microballoons composed of compositions selected from the group consisting of glass and ceramics, and additives to reduce flammability.

* * * * *